US010872459B2

(12) United States Patent
Foster et al.

(10) Patent No.: US 10,872,459 B2
(45) Date of Patent: Dec. 22, 2020

(54) SCENE RECOGNITION USING VOLUMETRIC SUBSTITUTION OF REAL WORLD OBJECTS

(71) Applicant: X Development LLC, Mountain View, CA (US)

(72) Inventors: Nicholas John Foster, Oakland, CA (US); Matthew Sibigtroth, Richmond, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/267,582

(22) Filed: Feb. 5, 2019

(65) Prior Publication Data
US 2020/0250879 A1 Aug. 6, 2020

(51) Int. Cl.
*G06T 15/00* (2011.01)
*G06T 15/08* (2011.01)
(Continued)

(52) U.S. Cl.
CPC .......... *G06T 15/08* (2013.01); *G06K 9/00201* (2013.01); *G06K 9/00671* (2013.01); *G06T 7/50* (2017.01); *G06T 7/70* (2017.01)

(58) Field of Classification Search
CPC .... G06D 1/0219; G06D 1/027; G06D 1/0238; G06D 1/0246; G06D 2201/0207
(Continued)

(56) References Cited

U.S. PATENT DOCUMENTS 8,477,995 B2 * 7/2013 Porter ............... H04N 13/122
  382/103
9,102,055 B1   8/2015 Konolige
(Continued)

FOREIGN PATENT DOCUMENTS

JP          5304714 B2    10/2013

OTHER PUBLICATIONS

Liu M, Zhang Y, He J, Guo J, Guo Y. Image-based 3d model retrieval for indoor scenes by simulating scene context. In2018 25th IEEE International Conference on Image Processing (ICIP) Oct. 7, 2018 (pp. 3658-3662). IEEE.*
(Continued)

*Primary Examiner* — Phu K Nguyen
(74) *Attorney, Agent, or Firm* — Fish & Richardson P.C.

(57) ABSTRACT

Techniques are provided to estimate of location or position of objects that are depicted in an image of a scene. Some implementations include obtaining an image of a scene; identifying an object within the image of the scene; obtaining a three-dimensional model that corresponds to the object that was identified within the image of the scene, the three-dimensional model being obtained from the database of three-dimensional models; determining, based on data from the three-dimensional model, an estimated depth of the object within the scene; generating or updating a three-dimensional representation of the scene based at least on the estimated depth of the object within the scene; and providing the three-dimensional representation of the scene, including at least a portion of the three-dimensional representation of the scene that was generated or updated based on the three-dimensional model of the object, to the scene analyzer.

19 Claims, 5 Drawing Sheets

(51) Int. Cl.
*G06K 9/00* (2006.01)
*G06T 7/50* (2017.01)
*G06T 7/70* (2017.01)

(58) Field of Classification Search
USPC ........................................................ 345/418
See application file for complete search history.

(56) References Cited

U.S. PATENT DOCUMENTS

| | | | |
|---|---|---|---|
| 9,129,433 B1* | 9/2015 | Korobkin | G06T 17/10 |
| 9,488,492 B2* | 11/2016 | Samarasekera | G06K 9/00637 |
| 9,626,798 B2 | 4/2017 | Zavesky | |
| 9,886,530 B2* | 2/2018 | Mehr | G06T 7/75 |
| 10,152,825 B2* | 12/2018 | Holzer | G06T 19/006 |
| 10,388,025 B2* | 8/2019 | Mollis | G06T 7/337 |
| 10,546,417 B2* | 1/2020 | Black | G06T 7/77 |
| 10,571,926 B1* | 2/2020 | Zhang | G05D 1/0238 |
| 2007/0285419 A1 | 12/2007 | Givon | |
| 2012/0314096 A1 | 12/2012 | Kruglick et al. | |
| 2013/0281207 A1 | 10/2013 | Lyons | |
| 2014/0063018 A1 | 3/2014 | Takeshita | |
| 2015/0178321 A1 | 6/2015 | Rivlin | |
| 2015/0317821 A1 | 11/2015 | Ding et al. | |
| 2016/0055677 A1 | 2/2016 | Kuffner | |
| 2018/0114264 A1 | 4/2018 | Rafii | |
| 2018/0286119 A1 | 10/2018 | Foster et al. | |
| 2019/0026956 A1 | 1/2019 | Gausebeck | |
| 2019/0332866 A1* | 10/2019 | Beall | H04N 5/23238 |
| 2020/0050904 A1* | 2/2020 | Powers | G06K 9/66 |
| 2020/0051318 A1* | 2/2020 | Muthler | G06F 9/3877 |
| 2020/0053347 A1* | 2/2020 | Marchak, Jr. | H04N 13/279 |
| 2020/0064483 A1* | 2/2020 | Li | G01S 17/86 |

OTHER PUBLICATIONS

Liu M, Zhang K, Zhu J, Wang J, Guo J, Guo Y. Data-driven Indoor Scene Modeling from a Single Color Image with Iterative Object Segmentation and Model Retrieval. IEEE transactions on visualization and computer graphics. Nov 12, 2018.*

Grabner A, Roth PM, Lepetit V. 3D Pose Estimation and 3D Model Retrieval for Objects in the Wild. In2018 IEEE/CVF Conference on Computer Vision and Pattern Recognition (CVPR) Jun. 1, 2018 (pp. 3022-3031). IEEE.*

Mousavian A, Anguelov D, Flynn J, Kosecka J. 3d bounding box estimation using deep learning and geometry. InProceedings of the IEEE Conference on Computer Vision and Pattern Recognition 2017 (pp. 7074-7082).*

Tremblay J, To T, Sundaralingam B, Xiang Y, Fox D, Birchfield S. Deep object pose estimation for semantic robotic grasping of household objects. arXiv preprint arXiv:1809.10790. Sep. 27, 2018.*

Li Y, Wang G, Ji X, Xiang Y, Fox D. Deepim: Deep iterative matching for 6d pose estimation. InProceedings of the European Conference on Computer Vision (ECCV) 2018 (pp. 683-698).*

* cited by examiner

SCENE RECOGNITION USING VOLUMETRIC SUBSTITUTION OF REAL WORLD OBJECTS

BACKGROUND

Machine vision technologies analyze images of a scene to deliver automated inspection, process control, and robot guidance with respect to the scene. The more detailed the input images are, the more accurate analysis of the scene the machine vision technologies can provide.

SUMMARY

Implementations of the present disclosure include computer-implemented methods for providing detailed images to be used in machine vision technologies. More particularly, implementations of the present disclosure provide 3D representation of a scene based on an estimate of location or position of objects that are depicted in an image of the scene.

In some implementations, the method includes the actions of: obtaining, by one or more sensors of a control system that includes (i) the one or more sensors, (ii) a three-dimensional scene generator, (iii) a database of three-dimensional models, (iv) an object location estimator, and (v) a scene analyzer, an image of a scene, identifying an object within the image of the scene, obtaining a three-dimensional model that corresponds to the object that was identified within the image of the scene, the three-dimensional model being obtained from the database of three-dimensional models, determining, by the object location estimator and based on data from the three-dimensional model, an estimated depth of the object within the scene, generating or updating, by the three-dimensional scene generator, a three-dimensional representation of the scene based at least on the estimated depth of the object within the scene, and providing the three-dimensional representation of the scene, including at least a portion of the three-dimensional representation of the scene that was generated or updated based on the three-dimensional model of the object, to the scene analyzer.

Other implementations include corresponding systems, apparatus, and computer programs, configured to perform the actions of the methods, encoded on computer storage devices.

These and other implementations may each optionally include one or more of the following features: the estimated depth of the object is determined by using calibration information of the one or more sensors, as well as specifications of the object as indicated in the three-dimensional model, the calibration information being used to correlate size and position of the object within a field of view of the one or more sensors; in the image, the object is at least partially obscured by another object; the object is oblique to the one or more sensors; the data from the three-dimensional model includes an orientation of the object as depicted in the image; the data from the three-dimensional model indicates metadata of the object, including a dimension of a portion of the object that is not discernable from the image; the object is a first object, the three-dimensional model is a first three-dimensional model, and the actions further includes identifying a second object within the image of the scene, obtaining a second three-dimensional model that corresponds to the second object, the second three-dimensional model being obtained from the database of three-dimensional models, determining, by the object location estimator and based on data from the second three-dimensional model, an estimated depth of the second object within the scene, and determining a distance between the first object and the second object based on the estimated depth of the first object within the scene and the estimated depth of the second object within the scene, wherein the three-dimensional representation of the scene is generated or updated based on the distance between the first object and the second object; the estimated depth comprises a distance from the object to the one or more sensors; the actions further include identifying, in the image, a planar surface that is in contact with the object and determining a depth of the planar surface based on the estimated depth of the object; the actions further include determining that the image captures a confined area, and determining one or more dimensions of the confined area based on the estimated depth of the object.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available solutions. Images provided as input to a machine vision technology may suffer from the problem of occlusion. For example, self-occlusion, object occlusion, or frame occlusion limit the information that an image of an object provides about the object. Self-occlusion happens when some parts of an object that is captured in an image prevent some other parts of the object to be seen in the image. For example, an image of a front side of a box may provide no information about the back side of the box. Object occlusion happens when some objects in an image cast shadow or obstruct a full view of some other objects in the image. Frame occlusion happens when a part of an object that is captured in an image is out of field of view or beyond of the focus of a camera that has taken the image.

In addition, an image of a scene may provide incomplete or inaccurate information about a size or a location of an object. For example, it may be difficult to accurately estimate the size of an object depicted in an image when the object looks oblique in the image. Moreover, it may be difficult to estimate a location or a depth of an object in an image. Occlusion can worsen this problem. For example, it may be difficult to identify a first object that is partially obscured by a second object in an image, or to estimate the location of the first object with respect to the scene that is captured in the image. A wrong estimation of the size or the location of objects in a scene results in an inaccurate understanding of the scene.

The implementations of the present disclosure improve scene processing and recognition, including identifying sizes and locations of objects depicted in an image (or a sequence of images, such as a video). To provide more details about a scene captured in an image or about an object depicted in the scene, the implementations provide 3D representations of the objects and/or the scene. The 3D representation of an object is generated based on a 3D model of the object (or a 3D model of a second object that is sufficiently similar to the object).

The 3D model includes detailed design features or other attributes of the object that may be occluded in an image of the object. These design features and attributes include details on the size and position of the object. Using these details, the implementations provide contextual data regarding a scene, such as the ability to generate more accurate location data (as compared to location information that the image provides) that provide an estimation of locations of the objects within the scene, among other things. A location of a first object can also be estimated with respect to a second object by using 3D models associated with each of the first and the second objects. Providing an accurate estimate of the locations of the objects within a scene improves accuracy in creating a 3D representation of the scene.

Substituting an image of a scene with a 3D representation of the scene can be significantly beneficial in a variety of technologies such as in the technologies that are related to robotics, process control, automatic inspections, virtual reality (VR), augmented reality (AR), telepresence, scene or object recognition, annotations and visualization, e-commerce and payment applications. For example, an accurate estimation of a location of an object in a scene can help in navigating a robot relative to the object, guiding the robot to perform a safe gripping or grasping of the object without hitting other objects, protecting the robot from getting in contact with harmful objects (e.g., objects that have high temperature, or high magnetic field), estimating the power and time needed to do a task within the scene, etc.

The 3D representations of a scene, as described in this disclosure, can help in generating virtual representations of the scene. Such virtual representation can improve interaction with the scene such as moving through the scene, interacting with the object resided within the scene, etc. The 3D representations can provide more details about the objects that are depicted within an AR field of view and enhance annotation of the objects in an AR representation of the scene. The 3D representations can be used in a variety of technologies such as in telepresence applications by providing a more realistic presentation, in e-commerce and payment applications by providing the ability to transact with 3D objects, etc. In short, the implementations of the present disclosure improve the ability to artificially recognize and analyze a scene from an image of the scene and provide more details about the scene than what would be derived from the image.

Methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
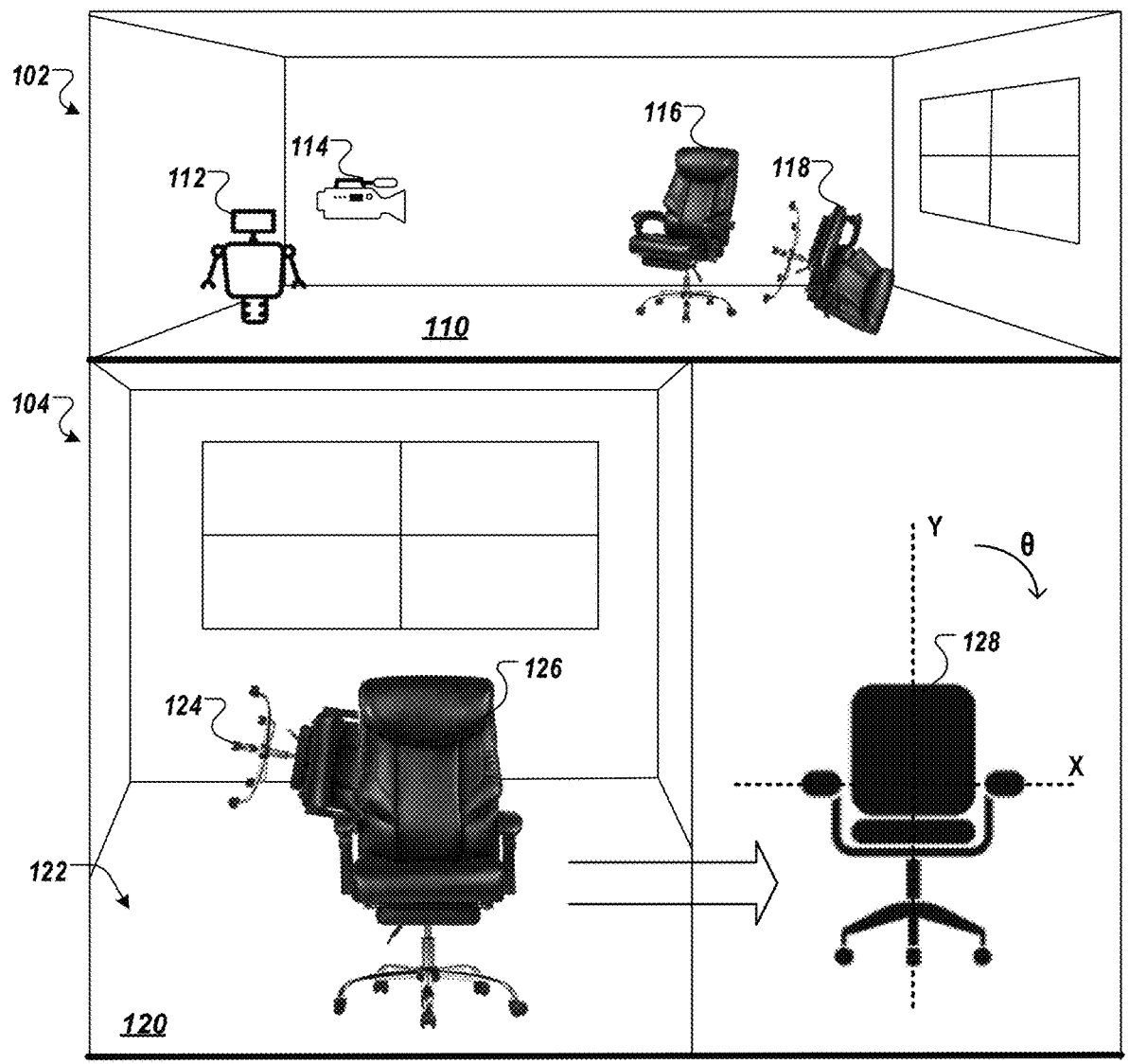
FIG. 1 depicts an example application of the implementations of the present disclosure.
Figure 1:
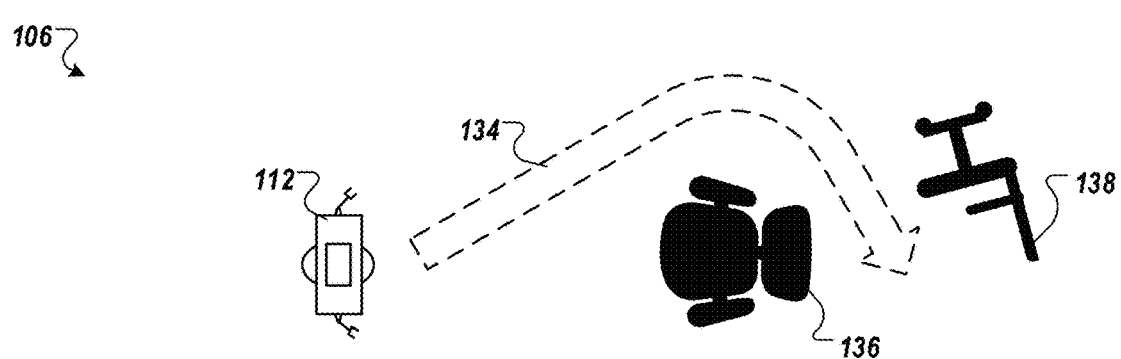

Implementations of the present disclosure include computer-implemented methods for providing 3-dimentional (3D) representation of a scene based on an estimate of locations, size and/or positions of the objects that are depicted in an image of the scene. The 3D representation provides information that are not directly derivable from the image. For example, a camera may be positioned in a front side of a cup and the image taken by the camera may miss a handle located in a back side of the cup. The present implementations take the image and provides size and position of the cup by considering 3D features of the cup, including the handle on the back side of the cup.

By providing information that are not directly derivable from the image, the implementations reduce the problem of occlusion and provide a more detailed understanding of a scene and the objects within the scene. By doing so, the implementations advance the technologies directed to scene analysis, object detection and 3D object interaction.

For examples, a camera may take an image of a scene that includes a chair partially obscured by a table from the camera's angle of view. In such situation, a portion of the chair, e.g., the legs, the handles, etc., may be hidden behind the table and not discernable from the image. Nevertheless, the present implementations generate a 3D representation of the scene with an accurate estimate of the size of the chair, including the size and configuration of the hidden handles and legs.

The 3D representation can also provide an estimate of the position and the location of the chair in the scene and with respect to the table. The implementations do so by using a 3D model associated with the chair. The 3D model includes information on the size, configuration, and design features, as well as different orientations and angular views of the chair. Thus, even if the chair is oblique to the camera, the implementations can identify the corresponding 3D model by investigating the orientations and angular views associated with the 3D model.

Some embodiments of the implementations can be used to enhance augmented reality (AR) and virtual reality (VR) technologies. For example, the implementations can enhance VR scene generation and interactions with virtual objects. By adding details about the objects depicted in a scene, a more accurate virtual scene can be generated and a more prescience interaction with the objects can be achieved. Likewise, the implementations can add details about the objects depicted in a scene is captured within an AR field of view and improve the ability to perceive the object or manipulate or interact with it.

Some embodiments can be used for visual communication applications. For example, by adding details to the objects that are being presented at a video conference, the viewers can get a more realistic understanding of the objects. Such feature can be very useful for introducing or advertising products. In addition, adding details about the objects depicted in a video conference helps the viewer to get a better understanding of the surroundings of a presenter.

Some embodiments can be used in image applications, for example, for scene and/or object recognition, annotation, 3D visualization, etc. For example, the embodiments can be used for 3D visualization of how an object could fit in a scene (e.g., a room). Some embodiments can be used in video applications such as editing or adding visual effects of an image or a video. Some embodiments can be used in e-commerce and payment applications, such as providing the ability to transact with 3D objects.

Some embodiments can be used to analyze a scene and provide information of the 3D features of the scene to a robot controller. The robot controller may use the 3D features to facilitate a movement and/or activities of a robot. In the above example, the 3D features associated with the 3D representation of the cup provide information about the handle on the back of the cup the robot controller. This information may affect the way that the robot grasps or grips the cup.

FIG. 1 depicts an example environment for executing the implementations of the present disclosure. Part 102 of FIG. 1 illustrates a room 110 that includes two chairs 116 and 118. Camera 114 takes an image of the room 110. In this example, the image is to be processed to give instructions about the objects in the room to the robot 112 so that the robot 112 can navigate through the room without contacting any of the objects.

Part 104 of FIG. 1 illustrates the 2D image 120 that is taken by the camera 114. The 2D image 120 depicts the chairs 116 and 118 as the objects 124 and 126.

Since the 2D image 120 of the room 110 depicts the chairs 116 and 118 only from one angle, the 2D image 120 has no information about the 3D features of the chairs. For example, the 2D image 120 provides no information about how much space each of the chairs has taken, the thickness of any parts of the chairs, or the features located in the back of the chairs such as knobs, handles, etc. Accordingly, the 2D image 120 may not provide enough information for an accurate navigation of the robot 112.

To provide the 3D features of the objects identified in the 2D image, the objects are extracted from the image and compared with a plurality of candidate images that are obtained from a database. For each of the extracted objects, a candidate image that corresponds to the extracted object is selected from among the candidate images. In some implementations, a candidate image that is substantially similar to the extracted object is selected.

A candidate image can be substantially similar to an extracted object if the differences between the two is less than a threshold value or is negligible for a particular application. For example, if more than 80% of the parts of a candidate image match the parts of an extracted object, then the candidate image may be considered as substantially matching or substantially similar to the extracted object. In some implementations, a candidate image that is the most similar image to the extracted object, as compared to the other candidate images, is selected as the substantially similar candidate image.

Each candidate image is associated with a 3D model. The 3D model has metadata information about identity, characteristics, and/or visual appearance such as size, configuration, and different orientations, of an object that the model represents. The 3D model associated with the candidate image that is selected as corresponding to the extracted object can provide detailed information about the object. This detailed information is used to generate a three dimensional representation of the object, which can be used as a part of a 3D representation of the scene that is depicted in the 2D image.

For example, in part 104 of FIG. 1, the object 126 is identified and extracted from the 2D image 120. By comparing the 2D image of the object 126 to candidate images obtained from a database, the 3D model 128 is obtained. The 3D model 128 has information such as the size of the object that the model represents. A 3D representation 136 of the object 126 can be generated by using the information associated with the 3D model 128. The 3D representation of the object 126 is used to generate a 3D representation 130 of the room 110, for example, by substituting the 3D representation of the object 126 in a 2D or a 3D representation of the room.

The present implementations are also capable of providing 3D representations of objects that are partially obscured in an image. To do so, the implementations recognize visible features of an obscured object and look for the candidate images and 3D models that are substantially similar to the visible features.

For example, object 124 in image 120 is partially obscured by the object 126. The implementations recognize the visible features of the object 126, such as shape and size (e.g., height, width, length, angle) of legs, seat, and part of handles, and identify a candidate image that is, at least in part, substantially similar to the visible features—i.e., a candidate image that represents a chair with similar legs, seats, and handles. Based on the identified candidate image, a 3D model associated with the obscured object 124 is obtained and the 3D representation 138 of the object 124 is provided.

The implementations can also provide 3D representation of objects that are oblique in the image. For example, object 124 is an oblique object in the image 120 because chair 118 is positioned in an arbitrary angle that differs from a normal angle that is expected from a chair sitting in a usual positioned (e.g., the position of chair 116).

Similar to other objects, a 3D model of an oblique object in an image is obtained by identifying a candidate image that substantially matches the oblique object in the image. In some implementation, the stored 3D models include information about physical characteristics, such as center of gravity and/or different axis, of respective objects. Using this information, the implementations estimate how an object would look in different positions, for example, from different angles, in different orientations, etc. Each of these estimated looks can be stored as a candidate image so that regardless of how oblique an object is in an image, a substantially matching candidate image can be identified from the database. Based on which candidate image is selected, the 3D model can provide information about the captured position, such as orientation or angular view, of the object in the image.

For example, the 3D model 128 in FIG. 1 can be moved with respect to the two axes X and Y, and/or can be rotated or titled in an arbitrary angle to estimate different looks of the represented object. For example, the 3D model can be a computer aided design (CAD) model that can be manipulated, e.g., tilted in an arbitrary angle.

Alternatively or in addition, the database can store different looks of an object as different candidate images, and map the different looks to a single 3D model by mapping the respective candidate images to the single 3D model. A plurality of candidate images associated with a 3D model can be generated independently from the 3D model. For example, the plurality of candidate images can include 2D images that were taken from different angles and/or orientations of an object that is represented by the 3D model.

Each candidate image can include information of a respective look of the object that the candidate image represents. Thus, when a candidate image is selected as being substantially similar to an object, the 3D model receives information of the respective look in the candidate image to provide details about the position, such as orientation or angular view, of the object. These details can be used to provide an accurate 3D representation of the object, including the area that the object takes in the scene.

For example, the object 124 can be compared to a plurality of candidate images to select a candidate image that represents an object substantially similar to the object 124 as depicted in the image 120. The selected candidate image may indicate that the object 124 is associated with the 3D model 128, and is tilted for 100 degrees in direction 8.

Once a 3D model is obtained based on a selected candidate image, a location of the object can be estimated based on the size information included in the 3D model. As explained above, a 3D model associated with an object includes detailed information about physical characteristics of the object such as dimensions of the object.

Using the size information of the 3D model in view of the size of the object as depicted in the image, one can use projection geometry techniques to estimate the location of the object. For example, based on the size that is obtained from the 3D model of the object and a number of pixels that the object takes in the image, a depth of the object can be estimated. A depth of an object can indicate a distance from the object to the image-taking instrument that took the image.

To improve accuracy of the location estimation, calibration information of an image-taking instrument can be taken into account. The calibration information includes physical properties of the image-capturing instrument such as focal length, aperture, lens type, etc., that would provide general information about the images that the instrument takes, such as distortion, contrast, character of edges, field of view, etc. The calibration information as well as the size information of the 3D model can be used to correlate size, position, and location of the object within a field of view of the image-taking instrument.

Distance between multiple objects depicted in an image of a scene can be determined based on the estimated size and/or location of each of the objects within the scene. For example, a distance between a first object and a second object depicted in an image can be determined based on an estimated depth of the first object and an estimated depth of the second object. Moreover, project geometry techniques can be used to estimate distance between multiple objects based on a number of pixels that each object takes and the object's size as obtained from its respective 3D model.

Although the image 120 in this example is a 2D image, the image received from the sensors can be a 3D image. For example, the image may be taken by a depth camera that can provide a 3D image of the scene. In such case, the 3D representation of the scene can update the 3D image by substituting the 3D model into the 3D image and/or by adding the information of the 3D model 128 into the 3D image. The 3D representation can update the 3D image to improve the fidelity (e.g., resolution, details, etc.) of the 3D image. Alternatively or in addition, the 3D representation can be generated in the same manner as described above with respect to a 2D image, and substitute the 3D image that was received from the sensors.

The 3D representation of the scene can be used for a variety of purposes. For example, the 3D representation can be used to enhance a virtual, interactive, and/or annotated representation of the room in VR, AR, telepresence, e-commerce, robotics, or other technologies.

Part 106 of FIG. 1 represents an example application of the 3D representation of the scene in robotic technologies. In this example, the 3D representation 130 of the room 110 is provided to a robot controller. The robot controller uses the information associated with the 3D representation 130 to learn about the size and location of objects in room 110 and facilitate the robot's activities. Based on the 3D representation 130, the robot controller designates the navigation path 134 for the robot's movement through the room 110. In another example (not shown), the 3D representation 130 can be used to generate a virtual representation of the room 110 or can be used to annotate the objects resided in the room in a video or image representation of the room 110.

Figure 2:
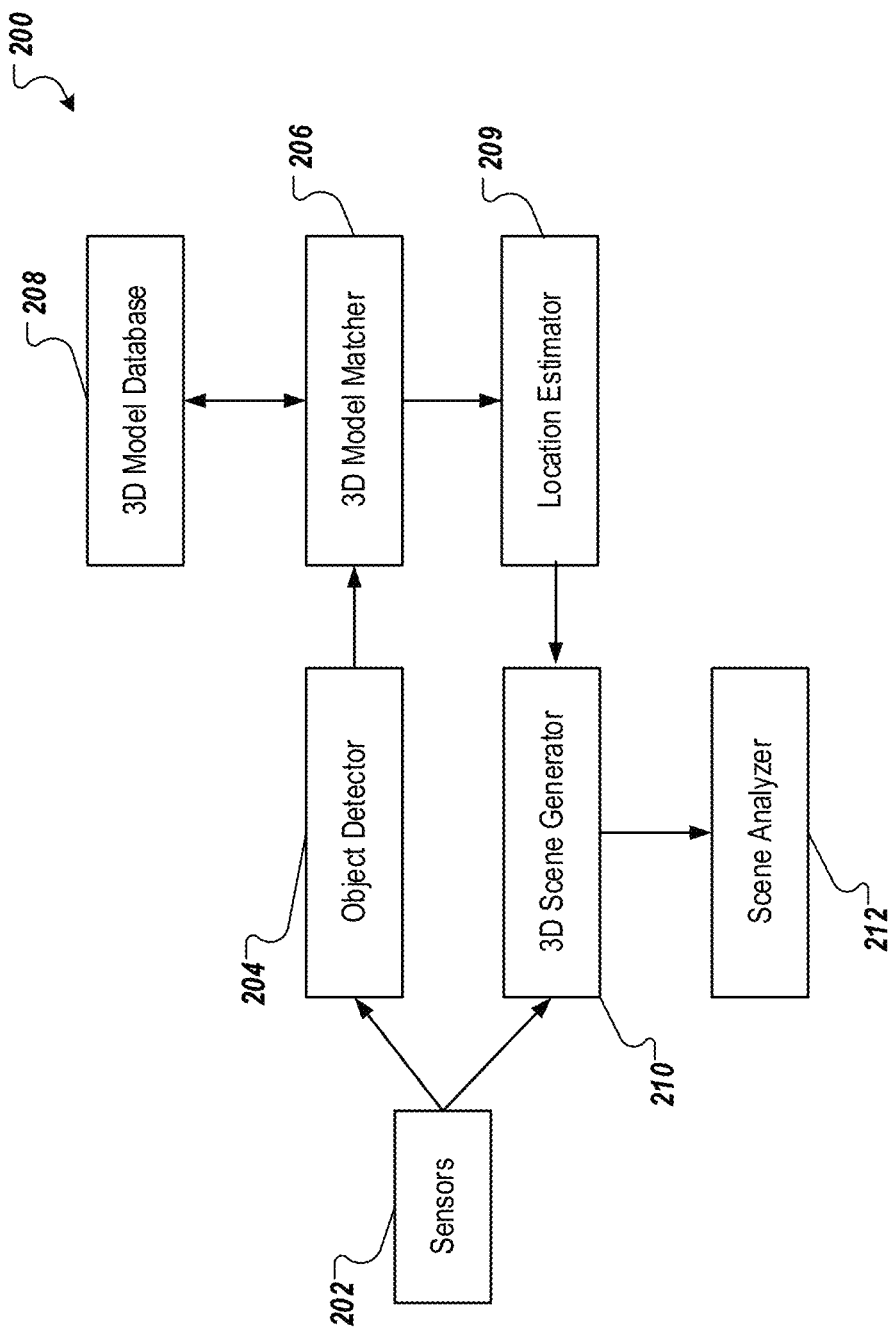
FIG. 2 depicts an example system for performing the operations according to the implementations of the present disclosure.

FIG. 2 depicts an example system 200 for performing the operations according to the implementations of the present disclosure. The system 200 can be implemented by a combination of hardware, software and firmware.

The sensors 202 include any device or combination of devices that are capable of taking an image or a video. For example, the sensors can include the camera 114 in FIG. 1. The image can include a 2D image, a colored images, black and while images, infrared images, etc.

The sensors can be positioned in a fixed location. For example, the sensors can be part of a security camera, or a camera that takes a video for video conferencing purposes. The sensors may move around a scene or may be positioned on a movable apparatus. For example, the sensors can be attached to a moving robot or can be wearable as a headset (e.g., as an AR headset or a goggle).

To reduce the power consumption of the sensors or the apparatus that implements the system 200, the sensors may be configured to take periodic or a few shots of images rather than continuous images such as videos. For example, a robot may take one photo for every predetermined period of time. The predetermined period of time can be a fixed period, such as 5 minutes, or can be determined based on the robot's operation speed, such as one photo per minute if operating at a first level speed and two photos per minute if operating at a second speed that is higher than the first speed.

The sensors may take a photo upon detecting a change in the environment, such as a change in light. The sensors may take a new photo upon detecting a movement. For example, in the case of the sensors on a headset, the sensors may take a new photo upon detecting that a user who is wearing the headset has turned his head or has walked. The sensors may take a new photo upon detecting of a movement of an object within the scene. For example, in a video conferencing, the sensors may take a photo upon a detection of a movement of the presenter or an object that is being presented. A movements can be detected by the sensors 202 or by one or more other sensors that are in communication with the sensors 202.

The sensors 202 send the image to an object detector 204 and a 3D scene generator 210. The object detector 204 detects one or more objects in the image. For example, the object detector detects object 126 from the 2D image 120 in FIG. 1. In some implementations, the object detector compares the image with an older image of the scene to detect one or more objects that are newly added to the scene. In some implementations, the object detector detects one or more particular object types. For example, in an image of a warehouse, the object detector may look for only couches and tables and ignore other shapes in the scene. The object detector may use detecting models and rules for such detections.

The object detector sends the object detected in the image to a 3D model matcher 206. The 3D model matcher compares the object with a plurality of candidate images associated with different objects to find and select a candidate image that corresponds to the object identified in the image. The 3D model matcher 206 may select a candidate image that is the most similar image to the object defined in the image as compared to any other candidate image.

The 3D model matcher 206 may select a candidate image based on one or more features of the object depicted in the image. For example, the image of the object may depict one or more of a label, a bar code, a particular shape, etc. that can be used to identify the object and/or one or more candidate images associated with the object. For example, the 3D model matcher may associate a particular bottle shape to a particular type of beverage.

The 3D model matcher 206 may select a candidate image based on a portion of an object depicted in the image. For example, an object may be partially obscured. In such cases, a candidate image that has a portion that is substantially similar to the visible parts of the object is selected.

Figure 3:
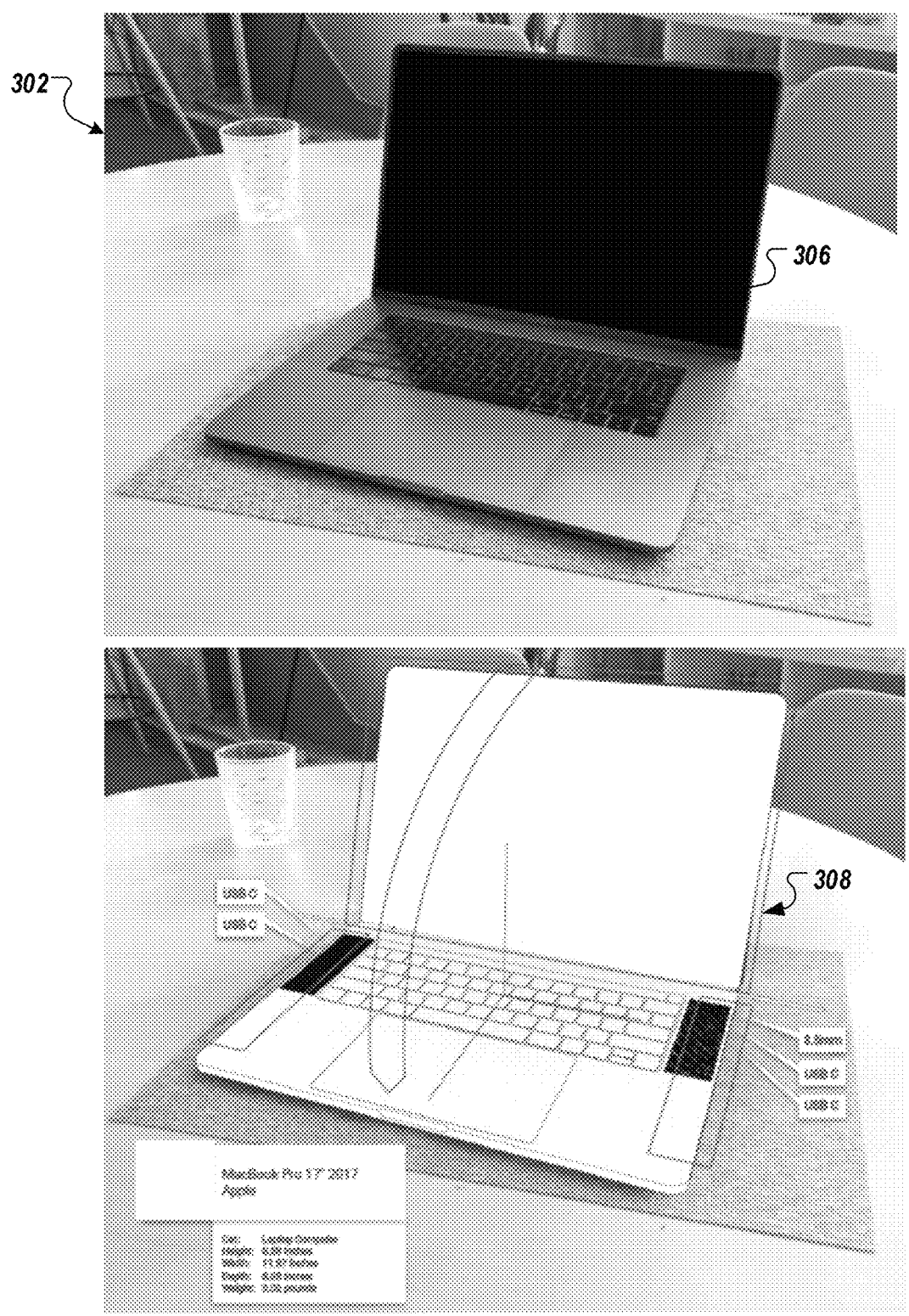
FIG. 3 depicts an example 3D representation of a scene, according to the implementations of the present disclosure.

The 3D model matcher 206 communicates with the 3D model database 208 to obtain a particular 3D model associated with the selected candidate image. The 3D models can include computer aided design (CAD) model of one or more objects. For example, FIG. 3 illustrates a CAD model 308 of the object 306 identified in the 2D image 302. The 3D models may have been obtained from the designers or manufacturers of different objects and stored at the 3D model database 208.

A 3D model may be associated with multiple candidate images. In some implementations, the candidate images associated with a 3D model are generated based on the 3D models. For example, a plurality of candidate images associated with a CAD model can be artificially generated from the CAD model.

A 3D model may have information about physical characteristics, such as mass, center of gravity, and dimensions, of the object. Such 3D model can be used to generate different candidate images for different orientations and/or angular positions of the object. These candidate images can be used to identify the objects that are oblique in an image, because the candidate images provide a variety of positions, orientations, and angular views of the object.

In some implementations, a plurality of candidate images associated with a 3D model are generated independently from the 3D model. For example, the candidate images can include 2D images that were taken from different angles and/or orientations of an object that is represented by the 3D model. The candidate images can be stored in the 3D model database 208, or in another database in communication with the 3D model database 208 and/or in communication with the 3D model matcher 206.

Each candidate image may represent an angular view of the object that is represented by the 3D model. In searching for a candidate image that is substantially similar to the object identified in the image taken by the sensors 202, the 3D model matcher 206 may search multiple candidate images that represent different angular views of an object represented by a 3D model. If the 3D model matcher 206 finds a candidate image that presents an object's angular view that is substantially similar to the orientation of the object in the image from the sensors, the 3D model matcher selects the candidate image as corresponding to the object in the image from the sensors. In this way, an object that is oblique in an image can be associated with a candidate image that presents a similar angular view of the object. The 3D model matcher obtains the 3D model that corresponds to the selected candidate image from the 3D model database 208.

A 3D model can provide general or detailed information about an object that the model represents. The 3D model can provide an identity (e.g., a chair, a laptop, a cup, etc.) and/or one or more features of the object. The 3D model can also provide information about the orientation from which the selected image was taken.

Each 3D model in the database of 3D models can include one or more features of the object that the model represents. For example, a 3D model can include physical features of the object such as size, weight, mechanical elements, color, material, grasping features, etc. A 3D model can include non-visible features such as temperature, magnetic field, etc. of different parts of the object. These features can provide information that is not directly derived from a 2D image of the object. Such information can be used to enhance recognition of or interaction with the object (or with a 3D representation of the object, e.g., in a virtual representation of the scene). For example, such information can indicate the object's components or parts that are occluded in the 2D image, the object's size and dimensions that may not be recognizable from the image, the object's parts that are safe to approach in terms of, for example, temperature, magnetic field, etc.

The 3D model matcher 206 sends the obtained 3D model to the location estimator 209. The location estimator determines an estimated location of the object depicted in an image of a scene. The estimated location can include an estimated depth of the object. The estimated depth can be a distance from the object to the one or more sensors 204.

The location estimator may use calibration information of the one or more sensors 204, as well as specifications of the object as indicated in the 3D model to correlate size and position of the object within the field of view of the one or more sensors.

The location estimator 209 may use estimated locations of multiple objects to determine the distance between every two objects of the multiple objects. The location estimator may use projection geometry techniques to estimate a location of an object in the scene and/or a distance of the object with respect to other objects in the scene.

In some implementations, the location estimator 209 can identify size and/or location of an unknown item based on a size and/or a location of an object for which a 3D model has been obtained.

For example, the object detector 204 may detect a first object adjacent to (e.g., in contact with) a second object. The 3D model matcher 206 may obtain a 3D model for the first object from the 3D model database 208, but obtain no 3D model for the second object. The location estimator can estimate size and/or location of the second object by using the size information of the 3D model of the first object and by comparing the size of the first object as depicted in the image to the second object in the image.

For example, by comparing a number of pixels that the second object takes to a number of pixels that the first object takes, as well as by using the size information of the 3D model associated with the first object, the size and/or the location of the second object can be estimated. To provide an example, for an image that depicts a person holding a can, the location estimator can estimate a height of the person by using the can's size from a 3D model of the can and by comparing the size of the can with the height of the person as depicted in the image.

As another example for identifying size and/or location of an unknown item, the location estimator can identify a planar surface that is in contact with an object and determine the depth of the planar surface based on the estimated size and/or depth of the object. For example, in image 120 of FIG. 1, the object detector may identify the planar surface 122 as a surface in contact with object 126. The location estimator may then estimate the depth of the planar surface 122 through projection geometry and based on the estimated size and/or depth of the object 126 and the calibration information of camera 114. Depending on the location of the camera 114, the depth of the planar surface 122 can be the same as a depth of room 110.

As another example, when the image captures a confined area, the location estimator can determine one or more dimensions of the confined area based on the estimated size and/or depth of the objects in the image. For example, height and width of room 110 in FIG. 1 can be estimated through projection geometry and based on the estimated size and/or depth of object 126 and the calibration information of camera 114.

The 3D location estimator 209 sends the estimated size and/or location, such as depth, of the objects to the 3D scene generator 210. The 3D scene generator uses the information of the 3D model and the image of the scene received from the sensors 202 to generate or update a 3D representation of the scene. The 3D representation of the scene can be generated by replacing one or more objects that are detected from the scene by the object detector 204, with their respective 3D models and/or with 3D representations of the objects generated from the respective 3D models and at the estimated locations. If no 3D model is obtained for a detected object but the location estimator has estimated a location and/or a size of the object, the 3D scene generator 210 can replace the object with an item, e.g., a volume, of the estimated size and at the estimated location.

The 3D representation of the scene can include data that was not directly derived from the image of the scene taken by the sensors 202. For example, the 3D representation 130 of the scene 110 includes information about the sizes, the locations, and the distance between the chairs 116 and 118 (which are represented by the 3D representations 136 and 138, respectively) that were not directly derived from the 2D image 120 of the room 110.

The 3D representation of the scene can include the object's information such as design features or dimensions that are not visible from the image obtained from the sensors 202. For example, the 3D representation 136 in FIG. 1 can indicate thickness of the back cushion of chair 116 or a knob that is located on the back side of the chair, which are not visible or discernable from the image 120. Also, the 3D representation 138 can indicate the length or other design features of the back of chair 118, even though in the image 120 the object 124 that depicts the chair 118 is partially obscured by the object 126.

The 3D representation of the scene can even provide a representation of objects that are oblique to the one or more sensors 202. As explained above, the 3D model matcher is capable of identifying 3D models for oblique objects because for every 3D model the database includes a plurality of candidate images that each represent a particular angle of view and orientation of the object.

The 3D representation of the scene can include data indicating an attribute of the object that is not discernable from the image obtained from the sensors 202. For example, the 3D representation of the scene may indicate temperature of different objects in the scene, particular parts of an object that need to be handled with care, particular elements of an object that are designed for functional purposes such as grasping, areas with high magnetic field that a robot should avoid, etc.

The 3D representation of the scene can be used for a variety of purposes. For example, the 3D scene generator may send at least a portion of the 3D representation of the scene to a scene analyzer 212 to analyze the scene. The scene analyzer can use the 3D representation of the scene to enhance a virtual, interactive, and/or annotated representation of the room in VR, AR, telepresence, e-commerce, robotics, etc. technologies.

For example, the scene analyzer can be a robot controller for use in controlling a robot relative to the objects in the scene. The robot controller uses the received portion of the 3D representation of the scene to determine instructions that control movements and/or activities of a robot. The instructions can include navigation instructions that guide the robot's movement relative to the objects in the scene. The instructions can include grasping instructions that provide information such as which parts of the objects in the scene are safe to handle, how much power may be needed to move an object, etc.

The scene analyzer can be an AR engine or a VR engine. The AR engine may use the 3D representation to analyze a part of the scene that is depicted in an AR field of view and/or add details about the objects (e.g., the object 138) depicted in the scene. The VR engine may use the 3D representation to generate a virtual representation of the scene. Information from the 3D representation can be used to enhance accuracy in perceiving the objects and their locations or interacting with a virtual representation of the objects.

The scene analyzer may use the information of the 3D representation to determine what objects are included within the scene, what objects are missing, and/or what other objects can be added to the scene. For example, the scene analyzer may determine that the scene is a truck trunk that contains five chairs and has room for three more chairs. The scene analyzer can also determine which chair types can fit in the trunk.

As another example, the scene analyzer may determine that the scene depicts a part of a machinery that misses a part. For example, an ideal version of the machinery may include four screws while the 3D representation shows only three screws on the machinery. This information can be used, for example, to detect the defects in the machinery. The scene analyzer may even suggest what part types can be used to fill in the missing part. For example, the scene analyzer can suggest a screw size that fits the size of a whole that is left for the missing fourth screw.

The scene analyzer may determine different modes of an object. For example, a machinery may have a locked and an unlocked mode and the 3D representation may determine that the machinery depicted in an image is currently in the locked mode.

The scene analyzer may be used for visual communication purposes. For example, the 3D representation can be used in a video conferencing presentation to give the viewers a better understanding of the surroundings of the presenter. The 3D representation can provide non-discernable details about a product or an object that is being introduced in a video conference. Such details can provide the viewers a better understanding of the object.

Figure 4:
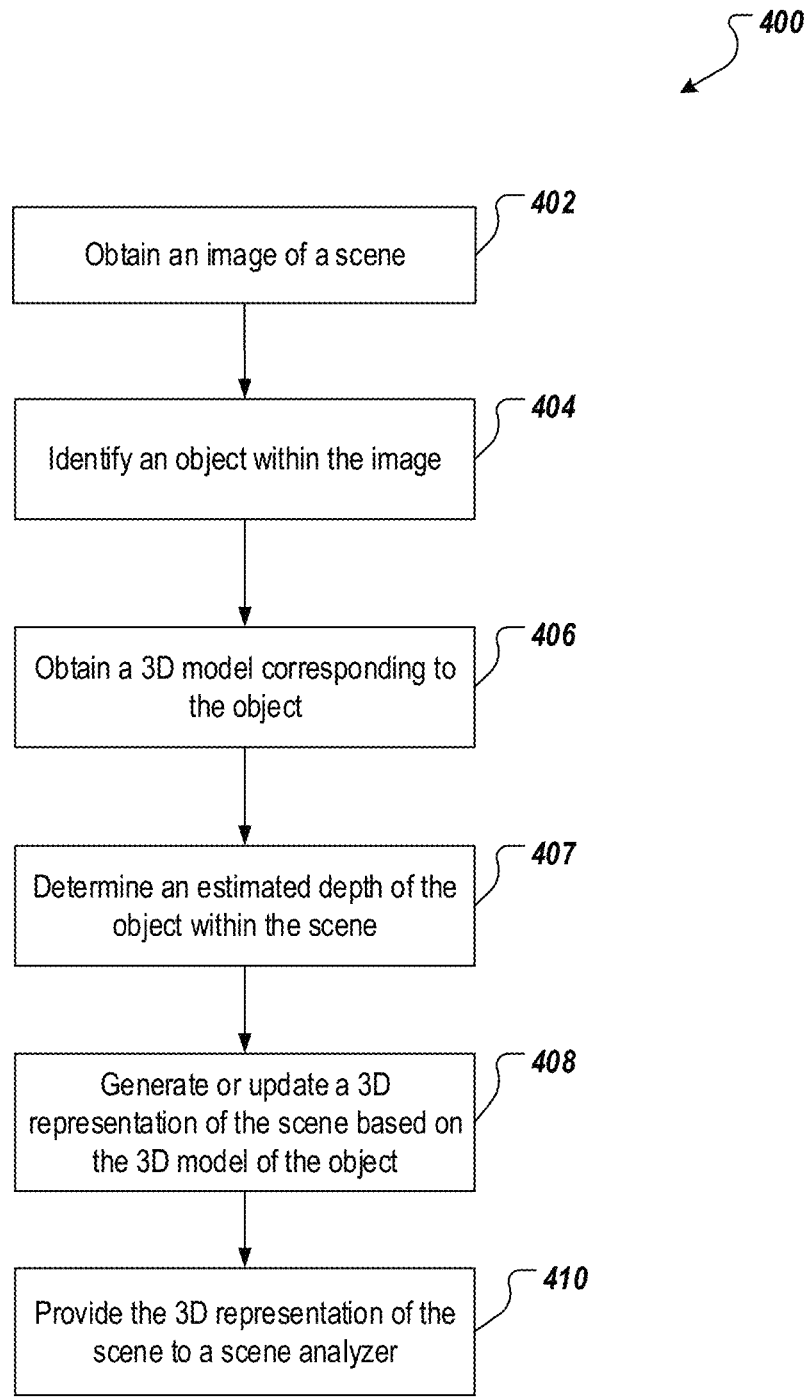
FIG. 4 depicts an example process that can be executed in accordance with implementations of the present disclosure.

FIG. 4 depicts an example process 400 that can be executed in accordance with the implementations of the present disclosure. In some implementations, the example process 400 may be performed using one or more computer-executable programs executed using one or more computing devices. The process 400 can be performed by the system 200 depicted in FIG. 2.

An image of a scene is obtained (402). The image can be obtained from the sensors 202 that have taken the image. For example, the 2D image 120 of a scene of the room 110 in FIG. 1 is obtained from the camera 114 that takes the 2D image.

An object within the image is identified (404). The object can be identified by any proper image processing techniques known to a person of ordinary skill in this art. For example, the object detector 204 can use image processing techniques to identify and/or extract the object 126 from the 2D image 120.

A 3D model corresponding to the object is obtained (406). For example, the 3D model matcher 206 can compares the object identified in the image with a plurality of candidate images to find a particular candidate image that is sufficiently similar to the object in the image that was obtained at 402. The 3D matcher communicates with the 3D model database 208 to obtain the 3D model that is associated with the particular candidate image. The 3D model may include information that are not discernable from the image of the scene that was obtained at 402.

An estimated depth of the object within the scene is determined (407). The depth of the object is estimated based on the data of the 3D model obtained in 406. For example, the location estimator 209 can estimate the depth of an object based on a 3D model that the model matcher 206 provides for the object. The estimated depth can be determined by using camera calibration information of the one or more sensors from which the image is obtained in 402, as well as specifications of the object as indicated in the 3D model. The calibration information is used to correlate size and position of the object within the field of view of the one or more sensors. The depth can be estimated based on projection geometry techniques.

Other information regarding the location of the object can also be estimated. The estimated location can indicate where the object is located with respect to the scene and/or with respect to other objects that are depicted in the image.

The obtained 3D model is used to generate or update a 3D representation of the scene (408). The 3D representation of the scene can be generated or updated by substituting the object in the image or in a 3D representation of the scene, with the 3D model and in the estimated depth. The 3D representation of the scene can add the information associated with the 3D model to the object identified at 404. Part 106 of FIG. 1 illustrates a 3D representation 130 of the scene depicted in the 2D image 120. The 3D representation 130 was generated based on the 3D model 128 associated with the object 126. The 3D representation of the scene can include information that was not apparent from the image that was obtained at 402.

In case that the image is a 3D image, the 3D image can be considered as a 3D representation that is being updated at 408. The updated representation can provide a higher fidelity, resolution, details, etc. that than the 3D image. Similarly, in case that the image is already associated with a first 3D representation, the first 3D representation can be updated at 408 based on the 3D model obtained at 406, to provide an updated 3D representation of the scene.

The 3D representation of the scene, including at least a portion of the 3D representation of the scene that was generated or updated based on the 3D model of the object, is provided to a scene analyzer (410). The scene analyzer uses the information in the 3D representation to analyze the scene and/or the object. The scene analyzer may use the information that were not directly derived from the image to provide more details about the object, such as the object's design features that were occluded in the image, and more details about the scene, such as location of the objects in the scene. The scene analyzer can use the 3D representation of the scene to enhance a virtual, interactive, and/or annotated representation of the scene in VR, AR, telepresence, e-commerce, robotics, etc. technologies.

For example, the scene analyzer can be a robot controller that uses the 3D representation for controlling one or more robots relative to the object identified at 404. For example, a robot controller can use the 3D representation 130 of the scene to provide navigation instructions to the robot 112 with respect to the object 138. The scene analyzer can be a VR or an AR engine that uses the 3D representation to enhance interaction with a virtual representation of the object. The scene analyzer can be part of a video communication application that uses the 3D representation to provide a more realistic presentation of the content presented during a video conference.

Figure 5:
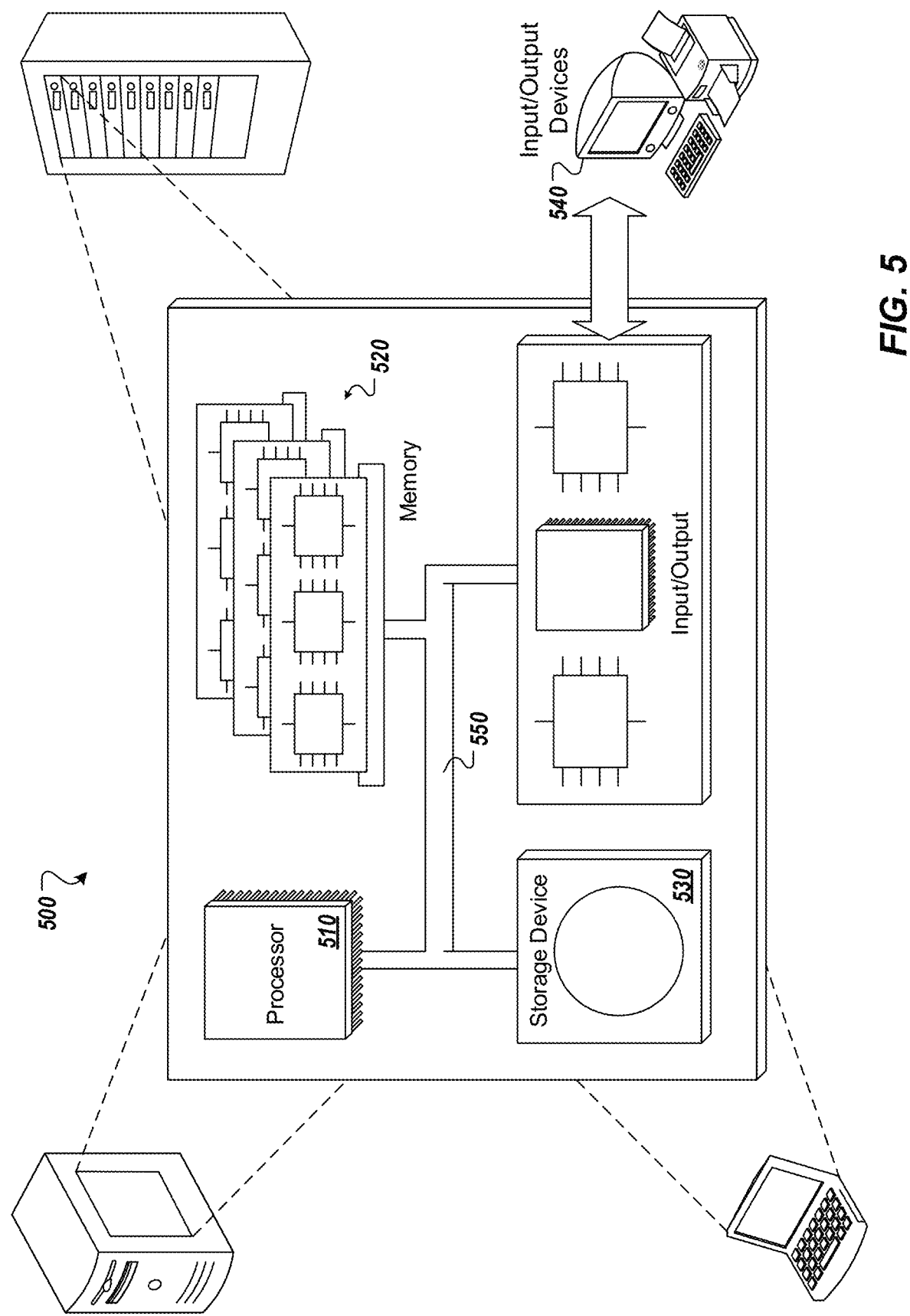
FIG. 5 depicts a schematic diagram of an example computing system for performing the operations according to the implementations of the present disclosure.

FIG. 5 depicts a schematic diagram of an example computing system 500 to execute the implementations of the present disclosure. The system 500 may be used to perform the operations described with regard to one or more implementations of the present disclosure. For example, the system 500 may be included in any or all of the server components, or other computing device(s), discussed herein. The system 500 may include one or more processors 510, one or more memories 520, one or more storage devices 530, and one or more input/output (I/O) devices 540. The components 510, 520, 530, 540 may be interconnected using a system bus 550.

The processor 510 may be configured to execute instructions within the system 500. The processor 510 may include a single-threaded processor or a multi-threaded processor. The processor 510 may be configured to execute or otherwise process instructions stored in one or both of the memory 520 or the storage device 530. Execution of the instruction(s) may cause graphical information to be displayed or otherwise presented via a user interface on the I/O device 540.

The memory 520 may store information within the system 500. In some implementations, the memory 520 is a computer-readable medium. In some implementations, the memory 520 may include one or more volatile memory units. In some implementations, the memory 520 may include one or more non-volatile memory units.

The storage device 530 may be configured to provide mass storage for the system 500. In some implementations, the storage device 530 is a computer-readable medium. The storage device 530 may include a floppy disk device, a hard disk device, an optical disk device, a tape device, or other type of storage device. The I/O device 540 may provide I/O operations for the system 500. In some implementations, the I/O device 540 may include a keyboard, a pointing device, or other devices for data input. In some implementations, the I/O device 540 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
   obtaining, by one or more sensors of a control system that includes (i) the one or more sensors, (ii) a three-dimensional scene generator, (iii) a database of three-dimensional models, (iv) an object location estimator, and (v) a scene analyzer, a two-dimensional (2D) image of a scene through which a robot is to navigate, wherein the 2D image that lacks depth information about objects within the scene;
   identifying, by the control system and based on matching (i) a portion of the 2D image of the scene that lacks depth information about objects within the scene with (ii) a stored, 2D image, an object within the image of the scene that is pre-associated with the stored, 2D image that matches the portion of the 2D image of the scene;
   after the object within the image of the scene has been identified based on matching (i) the portion of the 2D image of the scene that lacks depth information with (ii) the stored, 2D image, obtaining, by the control system, a three-dimensional model that corresponds to the object, the three-dimensional model being obtained from the database of three-dimensional models;
   determining, by the object location estimator and based on data from the three-dimensional model, an estimated distance between the one or more sensors and the object;
   generating or updating, by the three-dimensional scene generator, a three-dimensional representation of the scene through which the robot is to navigate based at least on (i) the estimated distance between the one or more sensors and the object, and (ii) dimensions of the object that are indicated by the three-dimensional model;
   providing, by the control system, the three-dimensional representation of the scene to the scene analyzer; and
   generating, for the robot to navigate and based at least on the three-dimensional representation of the scene, a navigation path through the scene that avoids contact between the robot and the object.

2. The method of claim 1, wherein the estimated distance is determined by using calibration information of the one or more sensors, as well as specifications of the object as indicated in the three-dimensional model, the calibration information being used to correlate size and position of the object within a field of view of the one or more sensors.

3. The method of claim 1, wherein, in the image, the object is at least partially obscured by another object.

4. The method of claim 1, wherein, the object is oblique to the one or more sensors.

5. The method of claim 1, wherein the data from the three-dimensional model includes an orientation of the object as depicted in the image.

6. The method of claim 1, wherein the data from the three-dimensional model indicates metadata of the object, including a dimension of a portion of the object that is not discernable from the image.

7. The method of claim 1, wherein the object is a first object, the three-dimensional model is a first three-dimensional model, and the method further comprises
identifying, by the control system, a second object within the image of the scene;
obtaining, by the control system, a second three-dimensional model that corresponds to the second object, the second three-dimensional model being obtained from the database of three-dimensional models;
determining, by the object location estimator and based on data from the second three-dimensional model, an estimated depth of the second object within the scene; and
determining a distance between the first object and the second object based on the estimated depth of the first object within the scene and the estimated depth of the second object within the scene,
wherein the three-dimensional representation of the scene is generated or updated based on the distance between the first object and the second object.

8. The method of claim 1, further comprising
identifying, in the image, a planar surface that is in contact with the object; and
determining a depth of the planar surface based on the estimated depth of the object.

9. The method of claim 1, further comprising:
determining that the image captures a confined area; and
determining one or more dimensions of the confined area based on the estimated depth of the object.

10. A non-transitory computer-readable storage medium coupled to one or more processors and having instructions stored thereon which, when executed by the one or more processors, cause the one or more processors to perform operations, the operations comprising:
obtaining, by one or more sensors, a two-dimensional (2D) image of a scene through which a robot is to navigate, wherein the 2D image that lacks depth information about objects within the scene;
identifying, based on matching (i) a portion of the 2D image of the scene that lacks depth information about objects within the scene with (ii) a stored, 2D image, an object within the image of the scene that is pre-associated with the stored, 2D image that matches the portion of the 2D image of the scene;
after the object within the image of the scene has been identified based on matching (i) the portion of the 2D image of the scene that lacks depth information with (ii) the stored, 2D image, obtaining a three-dimensional model that corresponds to the object, the three-dimensional model being obtained from the database of three-dimensional models;
determining, based on data from the three-dimensional model, an estimated distance between the one or more sensors and the object;
generating or updating a three-dimensional representation of the scene through which the robot is to navigate based at least on (i) the estimated distance between the one or more sensors and the object, and (ii) dimensions of the object that are indicated by the three-dimensional model;
providing the three-dimensional representation of the scene to a scene analyzer; and
generating, for the robot to navigate and based at least on the three-dimensional representation of the scene, a navigation path through the scene that avoids contact between the robot and the object.

11. The non-transitory computer-readable storage medium of claim 10, wherein the estimated depth of the object is determined by using calibration information of the one or more sensors, as well as specifications of the object as indicated in the three-dimensional model, the calibration information being used to correlate size and position of the object within a field of view of the one or more sensors.

12. The non-transitory computer-readable storage medium of claim 10, wherein, in the image, the object is at least partially obscured by another object.

13. The non-transitory computer-readable storage medium of claim 10, wherein, the object is oblique to the one or more sensors.

14. The non-transitory computer-readable storage medium of claim 10, wherein the data from the three-dimensional model indicates metadata of the object, including a dimension of a portion of the object that is not discernable from the image.

15. A system, comprising:
a computing device; and
a computer-readable storage device coupled to the computing device and having instructions stored thereon which, when executed by the computing device, cause the computing device to perform operations, the operations comprising:
obtaining, by one or more sensors, a two-dimensional (2D) image of a scene through which a robot is to navigate, wherein the 2D image that lacks depth information about objects within the scene;
identifying, based on matching (i) a portion of the 2D image of the scene that lacks depth information about objects within the scene with (ii) a stored, 2D image, an object within the image of the scene that is pre-associated with the stored, 2D image that matches the portion of the 2D image of the scene;
after the object within the image of the scene has been identified based on matching (i) the portion of the 2D image of the scene that lacks depth information with (ii) the stored, 2D image, obtaining a three-dimensional model that corresponds to the object, the three-dimensional model being obtained from the database of three-dimensional models;
determining, based on data from the three-dimensional model, an estimated distance between the one or more sensors and the object;
generating or updating a three-dimensional representation of the scene through which the robot is to navigate based at least on (i) the estimated distance between the one or more sensors and the object, and (ii) dimensions of the object that are indicated by the three-dimensional model;
providing the three-dimensional representation of the scene to a scene analyzer; and
generating, for the robot to navigate and based at least on the three-dimensional representation of the scene, a navigation path through the scene that avoids contact between the robot and the object.

16. The system of claim 15, wherein the estimated depth of the object is determined by using calibration information of the one or more sensors, as well as specifications of the object as indicated in the three-dimensional model, the calibration information being used to correlate size and position of the object within a field of view of the one or more sensors.

17. The system of claim 15, wherein, in the image, the object is at least partially obscured by another object.

18. The system of claim 15, wherein, the object is oblique to the one or more sensors.

19. The system of claim 15, wherein the data from the three-dimensional model indicates metadata of the object, including a dimension of a portion of the object that is not discernable from the image.

* * * * *